Patented Jan. 16, 1940

2,187,357

UNITED STATES PATENT OFFICE 2,187,357

METHOD OF PRESERVING YEAST

Jean Christian Matti, Pully, near Lausanne, Switzerland, assignor to the firm Compagnie Internationale de Procedes de Panification "Itam", Paris (Seine), France No Drawing. Application January 13, 1938, Serial No. 184,775. In France January 14, 1937

1 Claim. (Cl. 195—74)

This invention relates to a method for the preservation of yeast and to yeast obtained by this method.

Yeasts and more particularly those which are used, for instance, for bread-making are generally obtained in a moist condition and their life is limited to a rather short duration. On the other hand, the said yeasts, which are used for exciting a biological fermentation in the substances with which they are mixed, determine, in the doughs which are thus obtained, fermentations which are not always complete when the said doughs are shaped and baked, which is prejudicial to the digestibility of the bread which is obtained.

It is quite well known that yeast can be plasmolysed by means of sugar or salt; but the processes in which such additions are made to the yeast are intended for liquefying the yeast in order that it may be more readily and more completely dried. It is also well known that rather large quantities of salt, when added to the yeast, completely paralyze or totally kill the latter, and also that when the dough contains larger quantities of salt than convenient for the taste, the salt exerts a retarding action on the fermentation of the dough. Likewise, it is known that sugar, when added to the yeast in quantities which impede fermentation, has a preserving action.

In the present case, however, salt and sugar are added together to the yeast in order, on the one hand, merely to weaken or retard the fermentation power of the yeast and, on the other hand, to maintain the yeast unaltered in this state as long as possible after having thus been weakened. The retarding of the fermentation power is caused by the addition of salt but if salt alone were added, the purpose would not be attained but entirely defeated for the yeast cells would soon be killed thereby. However, if sugar is also added, this protects the enzymes against any serious degree of destruction and the salt no longer acts as a destroying agent, but has only a weakening action, that is to say the fermentation power is thereby retarded deliberately and maintained in this condition.

A yeast which has been treated with salt has even after but a short time of exposure to the action of salt, only a small proportion of cells left which are capable of living. On the contrary, however, a yeast to which salt and sugar have been added together according to the prescriptions herein, still contains 90 to 95% of active yeast cells capable of propagation. While the yeast does, to be sure, undergo a liquefaction through the osmotic action of the added salt and sugar and owing to the partial expulsion of the water of the cells, the living substance is not killed, and consequently the plasmolysis is only quite limited, for generally the cells would be killed by plasmolysis.

Thus the principle of the novel method herein consists in simultaneously using sugar and salt for a systematically conducted osmosis, plasmolysis and autolysis of the baking yeast, so that not a yeast preparation with killed yeast but a baking yeast capable of living and of acting is obtained which has a deliberately retarded fermentation power and a capacity for long duration of preservation, and which also allows a hitherto unknown commercial use in baking operations and more particularly the elimination of night work in bakeries.

The method according to the invention, by which the said drawbacks are done away, consists in incorporating with an alcoholic yeast of any suitable composition a substance such as sugar which preserves the vigor of the active elements of the yeast, in combination with an antiseptic substance such as common salt, for instance, which paralyzes the yeast elements giving rise to fermentation, for the purpose of maintaining the yeast with the same grade of activity during a more or less long time while permitting an immediate use of the same.

For the application of the invention to the preservation of a yeast for bread-making or panification and more particularly for retarded panification, a sugar such as saccharose in the form of cane-sugar, beetroot-sugar, maple-sugar, Indian corn-sugar and the like and common salt in a suitable quantity are incorporated with the pressed yeast or baker yeast containing about 70% of water.

As a practical indication I can say that the following proportions have proved satisfactory:

| | Grams |
|---|---|
| Baker yeast | 1000 |
| Saccharose | 600 to 1000 |
| Chloride of sodium or common salt | 200 to 600 | but the said proportions can be preferably the following:

| | Grams |
|---|---|
| Baker yeast | 1000 |
| Saccharose | 100 to 800 |
| Chloride of sodium or common salt | 100 to 800 |

For preparing the yeast in order to preserve the same, sugar is first added to the pressed yeast and then salt is added. This mixture is dissolved in the water of constitution of the yeast, thus giving a syrup in which the said yeast is maintained in suspension. The yeast which has been thus prepared is preserved under exclusion of air, for instance by storing the same in flasks or demijohns which are hermetically sealed or not.

The said yeast can be obtained also in a pasty or solid condition either through addition of jellifying substances such as pectins, agar-agar, gums and the like, or through the action of suitable physical agents.

Owing to the presence of sugar in contact with the yeast, the active elements of the latter retain their whole vigor, but the elements which give rise to fermentation are paralyzed by the presence of salt. Thus a very long time of preservation is obtained for the yeast and this preservation can even be practically infinite when the yeast is stored in a space containing no air.

For use it is sufficient to incorporate the yeast with the flour or the elements of doughs on which it must exert its action; the said yeast being maintained in a fluid condition or as a kind of syrup, it will thus be sufficient to pour this syrup on the flour or on the elements of the dough. One need not take any care of the quantity of salt which remains as a deposit on the bottom of the flask; in fact, the syrup in which the yeast is suspended is saturated with salt and cannot dissolve the whole quantity of salt which has been added to it.

It is indifferent, for the bread fermentation, that this salt is, or not, incorporated with the dough, that is to say that the yeast can be immediately used with or without any agitation.

The yeast which has been so preserved can be used advantageously for the preparation of bread dough which must be preserved during a certain period of time before it is baked, but it can be used also, of course, for the nonretarded fermentation of this dough. In either case the fermentation takes place gradually with a great regularity, the retarded fermentation insuring, on the other hand, the extension of the fermentation to the totality of the mass, which permits to obtain a bread which is more easily digested and assimilated.

The quantity of yeast to be used varies according to the kind of panification which it is desired to obtain, i. e. either a panification of a normal duration or, on the contrary, a more or less retarded panification; the quantity of yeast can vary, for instance, from 500 to 1000 grams for an ordinary batch of 50 kilograms of flour when it is desired to obtain a panification of a normal duration, while this quantity of yeast will vary, on the contrary, from 200 to 800 grams for the same quantity of flour when it is desired to obtain a panification which is retarded, for instance, from 12 to 18 hours.

The above indications are given by way of example and vary, of course, with the quality of the flour, the atmospherical conditions, the method of panification and the like.

The above indicated proportions may vary according to the water content of the yeast, since the saturation of this water through the salt must be insured, indeed, preferably for a good preservation.

The chloride of sodium or common salt which acts as an antiseptic paralysing the fermentation could be replaced by any other antiseptic able to fulfill the requirements of the hygiene of food. It could be replaced, for instance, by another chloride, a borate or a fluoride or like substances.

The invention is useful for yeasts and more particularly alcoholic yeasts for all kinds of uses and more particularly for bread-making.

What I claim is:

A process for making a baking yeast having a retarded fermentation action and a long duration of preservation which consists in mixing at room temperature, 1000 parts of yeast having a water content of about 70% with from 100–800 parts of saccharose, as well as from 100–800 parts of table salt.

JEAN CHRISTIAN MATTI.